United States Patent [19]

Kosugi et al.

[11] 4,220,734

[45] Sep. 2, 1980

[54] IMPACT AND WEATHER RESISTANT COMPOSITE OF POLYVINYLCHLORIDE AND ACRYLIC MODIFIER

[75] Inventors: Takumi Kosugi; Shigeki Yasunaga, both of Kobe; Yutaka Tanaka, Akashi; Yoshihiko Hashimoto, Kobe, all of Japan

[73] Assignee: Kanegafuchi Kagaku Kogyo Kabushiki Kaisha, Osaka, Japan

[21] Appl. No.: 363,984

[22] Filed: May 25, 1973

[30] Foreign Application Priority Data

May 26, 1972 [JP] Japan .................................. 47-52737

[51] Int. Cl.³ .............................................. C08L 51/00
[52] U.S. Cl. .............................. 525/85; 260/29.6 PT; 260/29.7 PT
[58] Field of Search ............ 260/876 R, 885, 29.6 PT, 260/29.7 PT; 525/85

[56] References Cited

U.S. PATENT DOCUMENTS

| | | | |
|---|---|---|---|
| 3,251,904 | 5/1966 | Souder et al. | 260/876 R |
| 3,426,101 | 2/1969 | Ryan et al. | 260/876 R |
| 3,787,522 | 1/1974 | Dickie et al. | 260/885 |
| 3,793,406 | 2/1974 | Bortnicu et al. | 260/876 R |

*Primary Examiner*—Melvyn I. Marquis
*Attorney, Agent, or Firm*—Moonray Kojima

[57] ABSTRACT

A thermoplastic resin composition consisting essentially of homopolymer or copolymer of polyvinyl chloride and a graft copolymer of a monomer mixture consisting essentially of alkyl methacrylate, aromatic vinyl compound, unsaturated nitrile and monovinylidene compound copolymerizable therewith, grafted to an aqueous elastomeric dispersion of alkyl acrylate, or a mixture of alkyl acrylate and mono vinylidene compound and a multi-functional cross-linking agent and of which the particles are agglomerated before or during the graft polymerization process, and process of manufacturing the same.

20 Claims, No Drawings

IMPACT AND WEATHER RESISTANT COMPOSITE OF POLYVINYLCHLORIDE AND ACRYLIC MODIFIER

This invention relates to polyvinyl chloride resin compositions having excellent weather resistance, impact resistance, mechanical properties and processability, and method of manufacturing same.

It is known that polyvinyl chloride or a copolymer of vinyl chloride comprising at least 70% by weight vinyl chloride and 30% by weight or less of a mono vinylidene compound (referred to as poly vinyl chloride) has excellent mechanical and chemical properties and is widely used commercially. However, such resin is usually poor in impact resistance. In order to improve this deficiency, various elastomers have been added. The most effective prior method is to prepare a graft copolymer of alkyl methacrylates and vinyl aromatic compound onto elastomers of conjugated dienes in aqueous dispersion or a graft copolymer of the above mentioned system further mixed with unsaturated nitriles, and a copolymer grafted with aromatic vinyl compounds and unsaturated nitriles. However, these copolymers have a disadvantage in that impact resistance decreases extremely when the polymers are used outdoors, because the copolymers contain excess double bonds in the polymer chain.

A method has also been proposed wherein a conventional elastomer of conjugated dienes are substituted for a saturated acrylate elastomer which is excellent in weather resistance.

But, these prior copolymers cannot sufficiently improve the impact resistance of polyvinyl chloride resin.

British Pat. No. 927821 discloses a copolymer grafted with alkyl methacrylate, an alkyl methacrylate and acrylonitrile, aromatic vinyl compound and an alkyl methacrylate onto acrylic copolymer consisting of alkyl acrylates and cross-linked monomer (1.5% by weight or less). Allegedly, this copolymer improves impact resistance of polyvinyl chloride resin. However, this method has various disadvantages such as insufficient impact resistance and deficiencies in other properties.

Generally, in order to reinforce a hard and brittle resin with an elastomer, it is required to disperse in the resin, suitably sized particles of rubber-like polymer, which has sufficiently lower glass transition temperature than a temperature at which the resin is used. For this purpose, it is desirable that suitably sized particles of the rubber-like polymer be prepared in aqueous dispersion, and then the particles be transferred, without changing their size, into the final polymer product to be improved.

The present inventors studied methods of reinforcing polyvinyl chloride resin with an elastomer of an alkyl acrylate, and discovered that a cross-linked structure is required for alkyl acrylate elastomer particles in order to transfer the elastomer particles of the aqueous dispersion into polyvinyl chloride resin without changing the particle size, and that the structure of the graft polymer should be compatible with polyvinyl chloride resin. In order to obtain these conditions it was discovered that a process is desirable, in which the alkyl acrylate particles of smaller cross-linking unit are agglomerated secondarily to the desired size for reinforcement of the polyvinyl chloride resin. In this manner a graft structure is obtained which is compatible with polyvinyl chloride resin and produces excellent impact resistance which can not be obtained by the usual cross-linking structure alone.

The present invention encompasses a thermoplastic resin composite consisting essential of 3–50 parts by weight of (A) and 97–50 parts by weight of (B), wherein (A) is a graft polymer which is prepared by the graft polymerization of 20–70 parts by weight of monomer mixture (I) consisting essentially of 0–100% by weight of an alkyl methacrylate having an alkyl group with 1 to 4 carbon atoms, 0–90% by weight of an aromatic vinyl compound, 0–50% by weight of an unsaturated nitrile, and 0–20% by weight of a monovinyl idene monomer copolymerizable therewith, to an aqueous elastomeric dispersion (II) which has been prepared from an alkyl acrylate having an alkyl group with 2 to 8 carbon atoms, or from a mixture of at least 80% by weight of alkyl acrylate and 20% by weight or less of a monovinylidene compound, and 0.1 to 8% by weight of a multi-functional cross-linking agent, and of which the particles are agglomerated before or during the graft polymerization process, and wherein (B) is a polyvinyl chloride or a copolymer of at least 70% by weight of vinyl chloride and 30% by weight or less of a monovinylidene compound copolymerizable with vinyl chloride.

The aqueous dispersion of substrate polymer is prepared from the alkyl acrylates by a conventional emulsion polymerization. The alkyl group of the alkyl acrylates used may be those of carbon numbers 2 through 8 and be either straight or branched chain. Examples of such acrylates are ethyl acrylate, propyl acrylate, n-butyl acrylate, iso-butyl acrylate, pentyl acrylate, hexyl acrylate, n-octyl acrylate, 2-ethylhexyl acrylate, and the like. These monomers may be used either singly or as a mixture of two or more.

Up to 20% by weight of the alkyl acrylate can be replaced with a mono-vinylidene compound copolymerizable with the alkyl acrylate. Such compounds may be for example, alkyl acrylates whose carbon number of alkyl group is other than 2 through 8, acrylic acid esters, acrylic acid, metal salts of acrylic acid, acrylic amides, N-substituted acrylic amide, methacrylic acid esters, methacrylic acid, metal salts of methacrylic acid, methacrylic amide, N-substituted methacrylic amides, aromatic vinyl compounds and their derivatives, acrylonitrile, methacrylonitrile, vinyl ethers, vinyl esters, vinyl halides, vinylidene halides and the like and mixtures thereof. However, it is not favorable to increase the glass transition temperature of the rubber-like polymer by copolymerization with an alkyl acrylate. The type and amount of the monomer in copolymer should be chosen so that the glass transition temperature of the rubber-like polymer or copolymer would be below $-10°$ C.

It is necessary to copolymerize alkyl acrylates with multi-functional cross-linking agents. The cross-linking agents may be divinyl benzene esters from polybasic acid and vinyl alcohol such as divinyl adipate; di- or tri-methacrylates of polyhydric alcohols, such as mono- or poly-ethylene glycol dimethacrylates; di- or tri-acrylates of polyhydric alcohols, such as mono- or poly-ethylene glycol diacrylates; divinyl esters of polyhydric alcohols, such as ethylene glycol divinylether; di- or tri-allyl ester of polybasic acids, such as diallylphthalate, diallyl maleate, diallyl fumalate, diallyl sebacate; di- or tri-allylic compounds, such as diallyl ether, triallyl cyanurate, triallyl iso-cyanurate, triallyl phosphate; allyl ethers of polymerizable carboxylic acids, such as allyl methacrylate, allyl acrylate, allyl itaconate, monoallyl fumalate, mono allyl maleate, and the like.

These cross-linking agents can be used singly or as a mixture of two or more. The rubber-like polymer of acrylic ester copolymerized with the cross-linking agents increases its gel content in solvent and decreases its degree of swelling. For reinforcement of polyvinyl chloride resin, a gell content of at least 30% is preferable, and a gel content of more than 50% being more favorably preferred.

Further, it is known that the size of the dispersed particles of the rubber-like polymer used for reinforcement of polyvinyl chloride is between 500 to 3000 Å. Under usual conditions of emulsion polymerization, particle size of 500 to 1500 Å can be obtained most frequently. Under such conditions higher gel content may be favorably attained by use of cross linking agent containing allyl group.

The method of the present invention includes the feature that the aqueous dispersed particles of cross-linked rubber like polymer obtained under usual conditions are agglomerated to the aqueous dispersed particle sizes sufficient for reinforcement of polyvinyl chloride resin by secondary coagulation. This method was proven to produce excellent reinforcement agent, by the inventors' various experiments. The agglomeration by coagulation may be performed before, at any step of, or during the graft polymerization process.

In order to agglomerate the aqueous dispersed particles of the rubber-like polymer by coagulation before the grafting process, organic acids, inorganic acids, inorganic salts, or organic coagulants may be added. For example, water soluble organic acids such as formic acid, acetic acid, propionic acid, inorganic acids such as carbonic acid, hydrochloric acid, sulfuric acid, nitric acid, phosphoric acid and the like, and their acidic salts may be used. Examples of the inorganic salts are water soluble salts of the above mentioned organic acids, or salts of inorganic acids. Examples of organic coagulants are aqueous colloids, such as polyvinyl alcohol, polyvinyl pyrrolidone, polyacrylic amide, polyacrylic acid salts, carboxy methyl cellulose and the like.

After aqueous solution of a coagulant for agglomeration is added, the agglomeration may be interrupted, in case of necessity, by the following methods. In the case where organic or inorganic acids are added, any basic compound may be added to neutralize these acids. These are inorganic salts which are basic in aqueous solution and base organic compounds which contain nitrogen. In the case where inorganic salts are added interruption should should be carried out after stabilizing the aqueous dispersion by the addition of surfactants. The agglomeration of the particles or its interruption may be carried out either before or during the graft polymerization process.

In order to agglomerate the aqueous dispersed particles as the graft polymerization proceeds, the above mentioned coagulants are added before, or during the graft polymerization, or are added continously during the graft polymerization. Usual surfactants may be used in desired amounts as emulsifiers for emulsion polymerization to obtain aqueous dispersion of rubber like polymer. Examples of such emulsifiers are anionic surfactants; basic salts such as sodium, potassium ammonium and the like; fatty acids, such as lauric acid, stearic acid, palmitic acid, oleaic acid and the like; resinous acids, such as rhodizonic acid, hydrogenated rhodizonic acid and the like; metal salts of alkyl allyl sulfonic acids, such as dodecyl benzene sulfonic acid and the like; metal salts of alkyl sulfate esters, such as lauryl sulfate and the like; alkyl phenol sulfate and alkyl phenol polyoxyethylene sulfate; and nonionic surfactants such as alkyl polyoxyethylene ester, allyl polyoxyethylene ester and the like. Emulsifiers suitable for agglomeration of the particles are fatty acid salts or resin acid salts of sodium, potassium, or ammonium together with amounts of surfactants of sulfonic acid or sulfonic acid ester type, or together with metal salts of formaldehyde condensed naphthyl sulfonate, for example, because the use of emulsifiers results in agglomeration of the particles to desired sizes with little precipitation by coagulation of the particles.

Usual peroxides, redox initiators, or azo compounds may be used as initiators. Further, any regulator for molecular weight can also be used. The temperature of polymerization can be chosen from usual conditions for emulsion polymerization. However, extremely high temperatures decrease the molecular weight, thus causing undesired decrease of gel content. Favorable reaction temperatures are below 80° C. The temperature may be kept constant during the polymerization process or may be increased or decreased stepwise during the polymerization process.

The entire amount of the mixture of alkyl acrylate, monomer which copolymerizes with the alkyl acrylate, and multi-functional cross-linking agent can be added at the initial step of polymerization, or the entire amount or a part thereof may be continuously added during the course of the polymerization. The multi-functional monomer may be used after being homogeneously mixed with the monomer, or the concentration of the multi-functional monomer can be changed at the initial step or during the polymerization reaction. Favorably, the entire amount or part of the monomers may be added continuously during the polymerization reaction, since the heat of polymerization is easily removed from the system by this procedure.

The graft polymer is obtained by polymerization of 80 to 20 parts by weight of a monomer having compatibility with PVC in the aqueous dispersion containing 20 to 80 parts by weight of the above substrate polymer. Three types of resins having compatibility with PVC are (1) polyalkyl methacrylates or copolymers of alkyl methacrylates and aromatic vinyl compounds; (2) copolymers of aromatic vinyl compounds and unsaturated nitriles; and (3) copolymers and their derivatives of alkyl methacrylates, aromatic vinyl compounds and unsaturated nitriles.

The contents of the monomer mixture are alkyl methacrylates (0–100% by weight), aromatic vinyl compounds (0–80% by weight), unsaturated nitriles (0–50% by weight), and monomers having monovinylidene group and copolymerizable with the above mentioned monomers (0–20% by weight).

The alkyl group of alkyl methacrylates may be of alkyl group with 1 to 4 carbon atoms, and may be of either the straight or branched chain type. A typical example is methyl methacrylate, and other examples are ethyl, propyl, isopropyl, isobutyl, or tertiary butyl methacrylate. A typical example of aromatic vinyl compounds is styrene and other examples are α-substituted styrene, such as α-methyl styrene; substituted styrenes such as vinyl toluene, chlorostyrene, bromostyrene and the like and vinyl carbazole, and vinyl biphenyl, and the like and mixtures thereof.

The unsaturated nitriles can be, for example, acrylonitrile or methacrylonitrile.

Less than 20% by weight of the above-mentioned monomer can be replaced with other monomers copolymerizable therewith. Examples of the latter monomers are acrylic acid esters, acrylic amide, N-substituted acrylic amides, methacrylic acid, methacrylic acid esters of organic residues except alkyl groups containing 1 to 4 carbon atoms, methacrylamide, n-substituted methacrylamides, alkyl vinyl ethers, alkyl vinyl esters, vinyl halides, vinylidene halides and the like and mixtures thereof.

The properties of PVC composite significantly depend upon the composition of the grafted polymer. The graft polymer prepared from 20 parts by weight of the rubber like polymer of alkyl acrylate can not improve significantly the impact resistance of the polyvinyl chloride resin composite prepared therefrom. When the graft polymerization was carried out in the presence of 80% by weight or more of the rubber like polymer, the PVC composite was of very poor processability and of poor impact resistance.

Monomer composites for the graft polymerization are (1) alkyl methacrylate alone, or monomer mixture of alkyl methacrylate and aromatic vinyl compound may be adopted, in which the amount of replaced alkyl methacrylate is, favorably, less than 80% by weight. Moreover, the alkyl methacrylate can be replaced with other monomers, including acrylonitrile, up to 20% by weight; (2) in the case of a composite containing aromatic vinyl compound and unsaturated nitriles, a mixture of 50-80% by weight of the former and 50-20% by weight of the latter may be used. More unsaturated nitriles than the amount mentioned above may result in poor heat stability and poor processability of the polyvinyl chloride composite. In this case, up to 20% by weight of aromatic vinyl compound can be replaced with alkyl methacrylate; (3) in the case of the tri-component system of alkyl methacrylates, aromatic vinyl compounds and unsaturated nitriles, the following component amounts may be used, 20-80% by weight, 0-60% by weight and 10-50% by weight, respectively.

The graft polymerization may be carried out by adding the entire amount of monomer at one time, or by adding the entire amount or a part thereof continuously or intermittently. The polymerization can be carried out using pre-mixed monomers or by using monomer mixtures whose components may be changed during the polymerization reaction as long as the quality of the polymerized composite does not decrease. The concentrations of the monomer composites may be changed continuously or in two or multi-steps during the polymerization to the extent of the above three components or the composition of each component.

The 80 to 20 parts by weight of the monomers for grafting was polymerized in aqueous dispersion of 20 to 80 parts by weight of the rubber like polymer, which had been prepared in advance, the size of the particles of the aqueous dispersion was not altered or increased a little. Therefore, the impact resistance strength of the polyvinyl chloride composite obtained thereby can not be improved. Accordingly, it was necessary to grow the particles of the aqueous dispersion by adding coagulant before or during the addition of the monomer to be grafted, or during the polymerization and the addition of the monomer.

The graft polymerization can be carried out subsequently in the same reaction vessel after the preparation of the aqueous dispersion of the rubber like polymer, or it can be carried out in a separate reaction vessel. The usual reaction conditions recommended for emulsion polymerization can be adopted. The polymerization can be carried out with or without the addition of initiator, emulsifier, regulator for molecular weight and cross linking agent, except as outlined previously. In the case of addition of these reagents, these chemicals may be the same or different from those used in the preparation of the substrate polymer. The polymerization temperature, aqueous medium and other conditions may be the same or different from those used in the preparation of the substrate polymer or may be changed during the polymerization.

The graft copolymer thus obtained may be recovered from the aqueous dispersing by spray drying, or by coagulation by salting out process, filtration, washing, and drying processes. In this procedure, it is possible to coagulate simultaneously the aqueous dispersion of polyvinyl chloride resin. During the coagulation procedure, anti-oxidant thermostabilizer and processing agent for the polyvinyl chloride resin may be added.

After as previously discussed, 3–50 parts by weight of the graft polymer and vinyl chloride and/or 97–50 parts by weight or more copolymer, and 30 parts by weight or less of other monomers having mono-vinylidene groups are mixed, the mixture can be molded by a roller, a Banbury mixer, an extruder or an injection molding machine.

When the content of the graft copolymer is less than 3 parts by weight, little improvement of impact resistance is expected and when more than 50 parts by weight is present, the effect of addition of polyvinyl chloride resin is lost.

Moreover, the graft polymer of the present invention may be blended in polyvinyl chloride resin with other polymers which are compatible with each other; for example, ethylene-vinyl acetate copolymer; ethylene-acrylate copolymers; ethylene-methacrylic acid ester copolymers; ethylene-unsaturated carboxylic acid copolymers, and the grafted polymers of vinyl chloride thereupon; styrene-acrylonitrile copolymers, styrene-methacrylate acid ester copolymers, acryonitrile, butadiene-styrene copolymer )ABS), methacrylate-butadiene styrene copolymer (MBS), acrylonitrile-butadiene copolymers, and chlorinated polyethylene, and the like, and/or plasticizer.

In order to obtain the composites of the invention, thermostabilizers, ultraviolet absorber, lubricant, antistatic, finishing and other agents may be added.

The present invention is further illustrated hereinbelow by the actual examples set forth, which examples are not to be construed to be limiting of the invention in any manner. The parts and % in the examples are in terms of weight. Also, the units used for measurements are set forth in the notes preceding Table 3, and apply for all data set forth herein, some tables not setting forth same because of limitations of space.

EXAMPLE I (A) Preparation of Aqueous Dispersion of the Rubber-like Polymer

Butyl acrylate (98 parts), allyl methacrylate (2) parts, and cumene hydroperoxide (referred to as CHP) (0.2 parts) were added to the mixture shown in Table 1, under stirring, at 80° C., in 4 hours, Table 1.

| | |
|---|---|
| Water | 250 parts |
| Sodium oleate | 8 parts |
| Sodium naphthalene sulfonate condensed with formaldehyde | 0.2 parts |
| Sodium formaldehyde sulfoxylate (referred to as Rongalit) | 0.4 parts |
| Disodium ethylenediamine tetra acetate (referred to as EDTA.2Na) | 0.01 parts |
| Ferrous sulfate 7H$_2$O | 0.005 parts |

After the monomer was added completely, the mixture was allowed to stand for an hour at the temperature to give 96% polymer conversion. The diameter of the particles of the aqueous dispersion obtained was determined to be 650 Å, both from the observation by an electron microscope and from the turbidity measurement at 546 m$\mu$. The aqueous dispersion was coagulated by salting out, washed with water and methanol, and dried under reduced pressure. The dried polymer was taken up with stainless steel gauze of 100 mesh, and dipped in toluene for 48 hours in the dark. Then, after the toluene was wiped off from the polymer, the polymer was dried under reduced pressure, and then weighed. The gel content and degree of swelling were calculated by the following equations:

$$\text{Gel content} = \frac{\text{(weight of the dried polymer: } W)}{\text{(amount of the sample used)}} \times 100 \, (\%)$$

$$\text{Degree of swelling} = \frac{\text{(weight of swelled polymer; } P) - \text{(weight of the dried polymer: } W)}{\text{(weight of the dried polymer; } W)}$$

The gel content and the degree of swelling of the polymer thus prepared were 92% and 21, respectively.

(B) Preparation of the Graft Polymer

Mixture of aqueous dispersion of the rubber-like polymer and the mixture given in Table 2 were maintained at 60° C. The amount of water was adjusted so that the total amount of water of aqueous dispersion containing aqueous solution of acetic acid and potassium hydroxide mentioned below was 250 parts. To the mixture was further added 1% aqueous solution of acetic acid, the amount of which is given in Table 3, under agitation, and kept 15 minutes. Then, 2% aqueous solution of potassium hydroxide was added as shown in Table 3 for stabilization of the dispersion.

Table 2

| | |
|---|---|
| Aqueous dispersion of rubber-like polymer (based on the solid content of polymer) | 60 parts |
| water | 250 parts |
| Rongalit | 0.2 parts |
| EDTA.2Na | 0.01 parts |
| Ferrous Sulfate.7H$_2$O | 0.005 parts |

The mixture was further added with mixture of methyl methacrylate (40 parts) and CHP (0.2 parts) continuously in 4 hours, and the mixture was kept for an hour to complete the polymerization. The polymerization conversion was 95% or higher as shown in Table 3. The size of the particles of the aqueous dispersion is also given in Table 3. In the case where neither 1% aqueous solution of acetic acid nor potassium hydroxide were added, the size of the particles of the aqueous dispersion was 700 Å as shown in Table 3.

The dispersion of the graft copolymer thus obtained was coagulated by salting out by addition of hydrochloric acid, aged to form particles by warming, removed water, washed, and dried to give resin in powder form.

(C) Preparation of Polyvinyl Chloride Composites

The graft polymer (12 parts), polyvinyl chloride of average degree of polymerization of 7000 (100 parts), dibutyl tin mercaptide (2 parts), epoxy bean oil (1 part), and oil soluble wax (0.5 part) were mixed, and the mixture was kneaded using a hot roll adjusted at 160° C. for 5 minutes, and pressed to form, for 15 minutes, by a hot press at 180° C. to give a sample specimen. Impact resistance given by Izod impact strength which was measured based on ASTMD 256-56 at 23° C. The values obtained with a ¼ inch notch in a unit of Kg.cm/cm$^2$. The tensile strength was measured at 23° C. based on the same ASTM standard in a unit of Kg/cm$^2$. The elongation was given in % at the time of rupture in accordance with the same ASTM standard. These mechanical properties are shown in Table 3.

Table 3

| Example No. | I-1 | I-2 | I-3 | I-4 | I-5 |
|---|---|---|---|---|---|
| The amount of 1% acetic acid aq. in parts | 20 | 30 | 35 | 40 | 0 |
| 2% potassium hydroxide | 10 | 15 | 17.5 | 20 | 0 |
| Polymer conversion (%) | 97 | 96 | 97 | 97 | 96 |
| Size of particles of aq. dispersion (Å) | 1060 | 1260 | 1600 | 1880 | 600 |
| Polyvinyl Chloride Resin Composites | | | | | |
| Shock strength | 18.0 | 19.2 | 24.8 | 26.5 | 7.0 |
| Tensile strength | 471 | 458 | 458 | 450 | 435 |
| Elongation | 147 | 148 | 150 | 164 | 160 |

EXAMPLE II

Procedure of Example I was repeated except to use sodium sulfate as shown in Table 4 to increase in particle size of rubber-like polymer dispersed in aqueous solution, in the place of 1% acetic acid aqueous solution and 2% sodium hydroxide aqueous solution. Polyvinyl chloride resin composite was prepared by the same method as in Example 1 (C). The properties of the composite were shown in Table 4. It can be seen that mechanical properties were improved by the use of sodium sulfate as an agent of particle growing.

Table 4

| Example | II-1 | II-2 | II-3 |
|---|---|---|---|
| Sodium sulfate, added (parts) | 0.6 | 1.0 | 1.2 |
| Conversion to polymer (%) | 96 | 95 | 95 |
| Particle size of aqueous dispersant (Å) | 1100 | 1420 | 1550 |
| Polyvinyl Chloride Resin Composite | | | |
| Impact strength | 9.0 | 22.9 | 20.3 |
| Tensile strength | 465 | 458 | 454 |
| Elongation | 170 | 154 | 168 |

EXAMPLE III

The procedure of Example I was repeated using 1% mono-sodium phosphate aqueous solution. To increase particle size during grafting process after adding mono-sodium phosphate, three types of method were employed, as follows: (1) graft polymerization was performed without adding potassium hydroxide, (2) the polymerization system was stabilized by adding with potassium hydroxide during the time of graft polymerizing step which was followed by the final step of polymerization; and (3) after an agent for growing particles was added before the graft polymerization, the polymerizing system was stabilized by adding potassium hydroxide and polymerization followed. The polyvinyl chloride resin composites prepared by the above types of steps, and tests made thereon are shown in Table 5.

Table 5

| Example | III-1 | III-2 | III-3 |
|---|---|---|---|
| Mono-Sodium phosphate added (parts) | 0.1 | 0.2 | 0.4 |
| Potassium hydroxide is added at the following times | no | During graft polymerization | prior to graft polymerization |
| Potassium added (parts) | no | 0.15 | 0.8 |
| Conversion to polymer (%) | 94 | 95 | 96 |
| Particle size of aqueous dispersant (Å) | 1550 | 1600 | 1800 |
| Polyvinyl Chloride resin Composite | | | |
| Impact strength | 17.5 | 24.8 | 85.2 |
| Tensile strength | 440 | 435 | 442 |
| Elongation | 165 | 172 | 158 |

From the table it can be seen that increase in particle size has a beneficial effect on the properties of the resulting composite, independent of the time of particle size growth.

EXAMPLE IV

The procedure in Example I(A) was followed except that sodium oleate and sodium naphthalene sulfonate condensated formaldehyde in Table 1 were replaced by 0.6 parts of sodium dodecyl benzene sulfonate. Conversion to polymer was 95% and the particle size of aqueous dispersant was 1050 Å. Gel content was 90% and the degree of swelling of resulting composite was 22.

The procedure in Example I(B) was repeated using the ingredient of Table 2, except to add 3 parts of sodium chloride as an agent of particle-growing without the use of acetic acid and potassium hydroxide. Conversion to polymer was 94% and the particle size of aqueous dispersant was 1800 Å.

Polyvinyl chloride resin composite made from the polymer thus obtained have 14.5 of impact strength, 490 of tensile strength and 165 of elongation. The units are as set forth above.

For comparison, graft polymerization was made without adding acetic acid or sodium chloride as agent of particle-growing, and sodium hydroxide. Conversion to polymer was 97% and the particle size of aqueous dispersant was 1200 Å. Polyvinyl chloride resin composites made from the polymer made as reference, have 7.5 of impact strength, 580 of tensile strength and 160 of elongation. The units are as set forth above.

EXAMPLE V

The procedure in Example I was repeated to prepare rubber-like polymer aqueous dispersion except to use 2 parts of divinyl benzene or 2 parts of ethylene glycol dimethacrylate as polyfunctional cross-linking agent in place of allyl methacrylate and to combine with adding 35 parts of 1% acetic acid aqueous solution and 175 parts of 2% sodium hydroxide as agent of particle-growing prior to performing graft-polymerization. The properties of polyvinyl chloride resin composite made from the polymer thus obtained are shown in Table 6.

Table 6

| Example | V-1 | V-2 |
|---|---|---|
| Rubber-like polymer | | |
| Cross-linking agent | Divinyl benzene | Ethylene glycol dimethacrylate |
| Conversion (%) | 94 | 96 |
| Gel content | 25 | 34 |
| Degree of swelling | 85 | 40 |
| Graft-Polymer | | |
| 1% acetic acid | 85 | 85 |
| 2% sodium chloride | 17.5 | 17.5 |
| Conversion to polymer | 96 | 95 |
| Particle size of aqueous dispersant | 1550 | 1600 |
| Polyvinyl Choride Resin Composite | | |
| Impact strength | 10.4 | 14.3 |
| Tensile strength | 462 | 455 |
| Elongation | 135 | 140 |

EXAMPLE VI

The procedure in Example 1 was repeated using diallyl phthalate and triallyl isocyanurate as polyfunctional cross-linking agent to prepare rubber-like polymer. The particle size of the polymer was 650 Å. The same procedure as in Example 1 was employed using 85 parts of 1% acetic acid aqueous solution and 17.5 parts of 2% sodium hydroxide aqueous solution as agent of particle-growing, which were added to the polymerizing mixture before graft polymerization. The properties of polyvinyl chloride resin composite made from the polymer thus obtained are shown in Table 7.

Table 7

| Example | VI-1 | VI-2 |
|---|---|---|
| Rubber-like polymer | | |
| Cross-lining agent | Diallyl phthalate | Triallyl cyanurate |
| Amount of cross-linking agent | 2 | 2 |
| Conversion | 96 | 97 |
| Gel content | 94 | 98 |
| Degree of swelling | 19 | 18 |
| Graft-polymer | | |
| 1% acetic acid | 85 | 85 |
| 2% sodium hydroxide | 17.5 | 17.5 |
| Conversion to polymer | 95 | 95 |
| Particle size of aqueous dispersant | 1700 | 1650 |
| Polyvinyl Chloride Resin Composite | | |
| Impact strength | 19.8 | 18.2 |
| Tensile strength | 462 | 470 |
| Elongation | 164 | 170 |

EXAMPLE VII

The procedure for growing particle size was taken as in Example VI, using the rubber-like aqueous dispersant in Example I(A). The procedure in Example I was repeated except to use the monomer mixture shown in Table 8 for graft-polymer in place of methyl methacrylate in Example I(B). The properties of polyvinyl chloride resin composite are shown in Table 8.

Table 8

| Example | VII-1 | VII-2 | VII-3 | VII-4 | VII-5 | VII-6 |
|---|---|---|---|---|---|---|
| Graft polymer | | | | | | |
| Methyl methacrylate | 75 | 50 | 30 | 10 | | |
| Styrene | 25 | 35 | 70 | 70 | 80 | 65 |
| Acrylonitrile | | 15 | | 20 | 20 | 35 |
| Conversion to polymer | 95 | 95 | 95 | 94 | 96 | 95 |
| Polyvinyl Chloride | | | | | | |

Table 8-continued

| Example | VII-1 | VII-2 | VII-3 | VII-4 | VII-5 | VII-6 |
|---|---|---|---|---|---|---|
| Resin Composite | | | | | | |
| Impact strength | 17.3 | 21.5 | 21.0 | 25.3 | 23.6 | 19.9 |
| Tensile strength | 464 | 460 | 452 | 463 | 465 | 450 |
| Elongation | 174 | 160 | 170 | 150 | 178 | 108 |

EXAMPLE VIII

500 Hours-exposure tests by a weatherometer were made on the samples selected from the polyvinyl chloride resin composite prepared according to the methods of Example I to Example VII. Impact and tensile strengths of the samples were measured prior to and after the exposure to testing condition, by a conventional method. As reference the measurements were made on the samples using a commercial methyl methacrylate-butadiene-styrene copolymer as a modifier to polyvinyl chloride (MBS resin). The results obtained are shown in Table 9.

Table 9

| Sample | Initial properties | | | Properties after 500 hr. exposure | | |
|---|---|---|---|---|---|---|
| | Impact strength | Tensile stenth | Elongation | Impact strength | Tensile strength | elongation |
| I-3 | 24.8 | 458 | 150 | 17.0 | 492 | 81 |
| I-5 | 7.0 | 495 | 160 | 5.5 | 538 | 58 |
| IV- | 14.5 | 490 | 165 | 11.8 | 580 | 70 |
| VI-1 | 19.8 | 462 | 164 | 12.5 | 510 | 67 |
| VII-1 | 17.3 | 464 | 174 | 9.8 | 497 | 75 |
| VII-2 | 21.5 | 460 | 160 | 12.3 | 505 | 70 |
| VII-4 | 25.8 | 468 | 150 | 14.0 | 494 | 68 |
| VII-5 | 23.6 | 465 | 178 | 15.3 | 502 | 92 |
| MBS | 32.7 | 461 | 149 | 2.0 | 506 | 14 |

EXAMPLE IX

Rubber-like polymer was prepared by the same method as in Example I(A) using 35 parts of 1% acetic acid aqueous solution and 17.5 parts of 2% sodium hydroxide aqueous solution as agent of particle growing. The same procedure as in Example I(B) was repeated except to add polyfunctional cross-linking agent to the grafting monomer mixture. The different types of grafting monomer and of cross-linking agent as shown in Table 10 were used. Samples IX-3 and IX-4 were prepared by two step polymerization as follows: Amount of monomer divided to two parts, the first part with added 0.1 part of CHP as a polymerization initiator, was added to the rubber-like polymer for 2 hours, followed by standing for 0.5 hours, and then the second part having the same amount of CHP as in the first part was added for 2 hours, followed by standing for 1 hour to complete the graft polymerization. Polyvinyl chloride resin composite was prepared by the method of Example I(C). The properties of the composite are shown in Table 10. It can be seen in the Table that cross-linking agent may be used to prepare graft polymer and two step polymerization also may be used to perform grafting.

Table 10

| Example | IX-1 | IX-2 | IX-3 | IX-4 |
|---|---|---|---|---|
| Graft polymer | | | | |
| First monomer mixture component (parts) | M 40 D 0.4 | M 40 AM 0.4 | M20 AM 0.4 | M6 A2 S 12 |

Table 10-continued

| Example | IX-1 | IX-2 | IX-3 | IX-4 |
|---|---|---|---|---|
| Second monomer component | | | M 20 | AM 0.2 M 20 D 0.2 |
| Conversion to polymer | 97 | 96 | 96 | 95 |
| Particle size of aqueous dispersant | 1560 | 1640 | 1520 | 1750 |
| Polyvinyl Chloride Resin Composite | | | | |
| Impact strength | 27.0 | 29.8 | 28.5 | 30.8 |
| Tensile Strength | 452 | 445 | 454 | 460 |
| Elongation | 155 | 148 | 158 | 162 |

Notes:
M: methyl methacrylate
A: Acrylonitrile
S: styrene
D: ethyleneglycol dimethyacrylate
AM: allyl methacrylate.

EXAMPLE X

Rubber like polymer aqueous dispersion prepared by the method of Example I was mixed with the components shown in Table 2. Amount of water was added to adjust to 250 parts after mixing acetic acid and sodium hydroxide aqueous solution with the rubber-like polymer aqueous dispersion. To the reaction mixture, the first monomer-mixture component shown in Table 11 was added dropwise for 1 hour at 60° C. to polymerize, 1% acetic acid aqueous solution was added with an amount shown in Table 11 for increase in particle size of the rubber like particles dispersed in aqueous solution. Then, 5% potassium hydroxide was added to stabilize the mixture solution. The second monomer component was added dropwise for 3 hours, and left to stand for 1 hour to complete the polymerization reaction. Polyvinyl chloride resin composites were prepared by the same method as in Example I(C) and the properties of the composites are shown in Table 11.

Table 11

| Example | | | |
|---|---|---|---|
| Graft polymer | | | |
| First monomer mixture component (see Table 10 for abbrev) | M 5 S 5 D 0.1 | M5 S 5 D 0.1 | M5 S 5 AM 0.1 |
| 1% acetic acid | 20 | no | 20 |
| 2% sodium hydroxide | 10 | no | 10 |
| Second monomer mixture component | M 30 | M 30 | M 30 D 0.8 |
| Conversion to polymer | 95 | 96 | 96 |
| Particle size of aqueous dispersant (Å) | 1450 | 700 | 1500 |
| Polyvinyl Chloride Resin Composite | | | |
| Impact strength | 18.7 | 7.5 | 20.8 |
| Tensile strength | 475 | 488 | 468 |
| Elongation | 175 | 142 | 164 |

Notes:
In this and all other Tables herein, some or all of the units, such as % for gel content, Kg/cm² for tensile strength, etc have been omitted. These units are identified in previous examples or tables or would be apparent to the worker.

From the table, it can be seen that growing of particle size may be done in the process of graft polymerization reaction.

EXAMPLE XI

The procedure in Example I was repeated to prepare rubber-like polymer aqueous dispersion except to use 49 parts of 2-ethyl hexyl acrylate and 49 parts of butyl acrylate in place of butyl acrylate. For increasing particle size prior to grafting process, 40 parts of 1% acetic acid aqueous solution and 20 parts of 2% sodium hydroxide aqueous solution were added to the reaction mixture. In Example XI-2, the procedure of Example I was repeated to prepare rubber like polymer aqueous dispersion using 89 parts of butyl acrylate and 9 parts of acrylonitrile, by the same method as above discussed. The properties of polymer obtained and the properties of polyvinyl chloride resin composites are shown in Table 12.

Table 12

| Example | XI-1 | XI-2 |
|---|---|---|
| Composition of rubber like polymer | 2-ethyl hexyl acrylate 49 parts butyl acrylate 49 parts | butyl acrylate 89 acrylonitrile 9 (both in parts) |
| Conversion (%) | 96 | 95 |
| Particle Size (Å) | 600 | 600 |
| Gel Content (%) | 92 | 94 |
| Degree of swelling | 24 | 16 |
| Graft polymer | | |
| Conversion | 95 | 96 |
| Particle Size | 1800 | 1900 |
| Polyvinyl Chloride Resin Composite | | |
| Impact Strength | 17.5 | 16.8 |
| Tensile strength | 480 | 485 |
| Elongation | 158 | 147 |

The foregoing description and discussion are for illustrative purposes only. Numerous other variations and modifications of this invention would be apparent to the worker skilled in the art. All such variations and modifications are to be considered to be within the spirit and scope of this invention.

What is claimed is:

1. Method of producing a thermoplastic resin composition comprising the steps of
   (A) preparing an aqueous elastomeric dispersion from alkyl acrylate having alkyl group with 2 to 8 carbon atoms or from a mixture of at least 80% by weight alkyl acrylate and 20% by weight or less of a monovinylidene compound, and 0.1 to 8% by weight of a multi-functional cross-linking agent;
   (B) graft polymerizing to said elastomeric dispersion, 20 to 70 parts by weight of a monomer mixture consisting essentially of alkyl methacrylate or a mixture of less than 80% by weight aromatic vinyl compound and remainder alkyl methacrylate, the particles of said dispersion being agglomerated before the graft polymerization; and
   (C) blending 3 to 50 parts by weight of the resulting graft polymer and 97 to 50 parts by weight of polyvinyl chloride or a copolymer of at least 70% by weight vinyl chloride and 30% by weight or less of a monovinylidene compound copolymerizable therewith.

2. Composite of claim 1, wherein the particle size in said dispersion is between 500 to 3000 Å.

3. Composite of claim 2 wherein said particle size is between 500 to 1500 Å.

4. Process of claim 1, wherein the gel content of said dispersion is at least 30%.

5. Process of claim 4, wherein said gel content is more than 50%.

6. Process of claim 1, wherein the particle size of said dispersion material is between 500 to 3000 Å.

7. Process of claim 6, wherein said particle size is between 500 to 1500 Å.

8. Process of claim 1, wherein the aqueous dispersed particles are agglomerated by coagulation using organic acids, inorganic acids, inorganic salts and/or organic coagulants.

9. Process of claim 1, wherein are added surfactants, emulsifiers, initiators, regulators and wherein emulsion polymerization is carried out at temperatures below 80° C.

10. Process of claim 1, wherein the mixture of alkyl acrylate, mono-vinylidene compound and cross-linking agent are added continuously or intermittently in the entire amount or in partial amount at the start or during polymerization.

11. A thermoplastic resin composite consisting essentially of
   (A) 97 to 50 parts by weight of polyvinyl chloride or a copolymer of at least 70% by weight of vinyl chloride and 30% or less by weight of a monovinylidene compound copolymerizable therewith and
   (B) 3 to 50 parts by weight of a graft polymer prepared by graft polymerizing to
     (1) an aqueous elastomeric dispersion from alkyl acrylate having alkyl group with 2 to 8 carbon atoms or from a mixture of at least 80% by weight alkyl acrylate and 20% by weight or less of a monovinylidene compound, and 0.1 to 8% by weight of a multifunctional cross-linking agent,
     (2) 20 to 70 parts by weight of a monomer mixture consisting essentially of alkyl methacrylate or a mixture of less than 80% by weight aromatic vinyl compound and remainder alkyl methacrylate, the particles of said dispersion being agglomerated before the graft polymerization.

12. Composite of claim 11, wherein said alkyl acrylate is selected from the group consisting of ethyl acrylate, propyl acrylate, n-butyl acrylate, iso butyl acrylate, pentyl acrylate, hexyl acrylate, n-octyl acrylate, 2-ethyl hexyl acrylate and mixtures thereof.

13. Composite of claim 11, wherein the glass transition temperature of said alky acrylate or alkyl acrylate mixture is below −10° C.

14. Composite of claim 11, wherein said cross-linking agent is selected from the group consisting of divinyl benzene esters, divinyl adipate, mono or poly ethylene glycol dimethacrylate, mono or poly ethylne glycol diacrylate, ethylene glycol divinyl ether, diallylphthalate, diallyl maleate, dialkyl fumaleate, dialyl sebacate, diallyl ether, triallyl cyanurate, triallyl iso-cyanurate, triallyl phosphate, allyl methacrylate, allyl acrylate, allyl itaconate, mono-allyl fumalate, mono allyl maleate and mixtures thereof.

15. Composite of claim 11, wherein said alkyl methacrylate is either straight or branched chain, and is selected from the group consisting of methyl, ethyl, propyl, isopropyl, isobutyl and tertiarybutyl methacrylate; and wherein said aromatic vinyl compound is selected from the group consiting of styrene, alpha methyl styrene, vinyl toluene, chlorostyrene, bromostyrene, vinyl carbazole, vinyl biphenyl and mixtures thereof, wherein said unsaturated nitrile is selected from the group consisting of acrylonitrile and methacrylonitrile.

16. Composite of claim 11, wherein a coagulant is added to said aqueous dispersion before or during addition of the monomer to be grafted or during polymerization.

17. Composite of claim 11, wherein said graft polymer is blended with other polymers compatible with polyvinyl chloride.

18. Composite of claim 11, wherein said dispersion has a gel content of at least 30%.

19. Composite of claim 18, wherein the said gel content is more than 50%.

20. Composite of claim 11, wherein the aqueous dispersion particles are agglomerated by coagulation using organic acids, inorganic acid, inorganic salts or organic coagulants.

* * * * *